United States Patent [19]
Okada et al.

[11] Patent Number: 5,995,098
[45] Date of Patent: Nov. 30, 1999

[54] PERSONAL INFORMATION ENVIRONMENT SYSTEM

[75] Inventors: Makoto Okada; Tadashige Iwao, both of Kawasaki, Japan

[73] Assignee: Fujitsu Limited, Kawasaki, Japan

[21] Appl. No.: 08/775,438

[22] Filed: Dec. 31, 1996

[30] Foreign Application Priority Data

May 17, 1996 [JP] Japan .................................. 8-123830

[51] Int. Cl.⁶ ........................................................ G06F 3/00
[52] U.S. Cl. ........................................................ 345/331
[58] Field of Search .................................. 345/339, 340, 345/349, 329, 330, 331

[56] References Cited

U.S. PATENT DOCUMENTS 5,515,491  5/1996  Bates et al. .
5,515,495  5/1996  Ikemoto .
5,600,765  2/1997  Ando et al. .
5,608,424  3/1997  Takahashi et al. .
5,647,796  7/1997  Cohen .

FOREIGN PATENT DOCUMENTS 362140169  6/1987  Japan .

Primary Examiner—A. Katbab
Attorney, Agent, or Firm—Staas & Halsey

[57] ABSTRACT

An information processing apparatus with which a user can establish a personal information environment in a group work by enabling the user to individually control information from his viewpoint, which is distributedly controlled by respective unique control methods in a variety of systems concerning the group work, and user can arrange information freely and without any distinction between files managed by a group and personal local documents.

45 Claims, 14 Drawing Sheets

FIG. 4

PIE DOCUMENT INFORMATION

DOC NAME: PIE PROPOSAL VR.A    SHARER: A
                                       B
PATH: NT:¥¥matisse¥eo2-2¥PIE¥SHARE

MEMO: PROPOSAL FOR           BIT MAP
      OPERATION DIVISION

EXTENSION
☒ INFORM OF  ☐ FORMAT
  CHANGE

FIG. 8

| | | |
|---|---|---|
| | Private | □□ |
| □□□□□ | CURRENT | |
| 📄 | GREETING | 1996/03/21 20:06 |
| 📄 | Why Don't You Play Badminton?? | 1996/03/26 16:33 |
| 📄 | INVITATION TO BARBECUE PARTY | 1996/04/11 10:36 |
| 📄 | BARBECUE PARTY CONTINUED | 1996/04/11 20:13 |
| 📄 | ADJUSTMENT IN BARBECUE PARTY | 1996/04/14 21:24 |
| 📄 | Classical MIDI Archives | 1996/03/26 12:04 |
| 📄 | MIDI links | 1996/03/26 15:34 |
| 📄 | The Classical MIDI Connection: | 1996/03/26 18:53 od |
| 📄 | [FWD]Hello! | 1996/04/04 18:43 |
| 📄 | Prof.N | 1996/04/05 10:42 |
| 📄 | REPLY | 1996/04/05 17:32 |
| 📄 | Re:REPLY | 1996/04/05 17:35 |
| 📄 | Re:Hello! | 1996/04/05 11:20 |
| 📄 | RECRUIT | 1996/04/04 14:06 |
| 📄 | Mr.O | 1996/04/17 11:40 |
| 📄 | Mr.O No.2 | 1996/04/15 00:34 |
| 📄 | Ms.M | 1996/04/11 12:36 |
| 📄 | Mr.J | 1996/04/16 16:03 |

STATUS AT TIME I
CurrentLayer = i

STATUS AT FREEZE
CurrentLayer = i+1

FIG. 13

```
PIE-SCRIPT:{a=CreateObject("PIEDoc");
SetShare(a,"NT:\\matisse\eo2-2\PIE\Share\96050900.000");
SetObjectEntity(a,"NT:\\matisse\eo2-2\PIE\Share\96050900.TXT");
SetObjectName(a,"TEMPLATE.TXT");
b=FindEntity("8316873420@xxx.xxx.xxx.xxx.co.jp");
SetLink(b,a,"LINKATTACH");}
PIE-MessageID:8316873420@xxx.xxx.xxx.xxx.co.jp
```

FILE SHARE

FIG. 14

| DATA | EXPLANATION |
|---|---|
| m_createdate | CREATION DATE |
| m_modifydate | MODIFICATION DATE |
| m_Lockman | LOCK FLAG(LOCK MAN) |
| m_username | ACCESS USER NAME LIST |
| m_jnum | ACCESS USER ID LIST |
| m_accessflag | ACCESS FLAG LIST | ns
PERSONAL INFORMATION ENVIRONMENT SYSTEM

BACKGROUND OF THE INVENTION

1. Technical Field of the Invention

The present invention relates to an information processing apparatus for establishing a personal information environment in a group work by enabling a user to individually control information from his viewpoint of which is distributedly controlled by respective unique control methods in a variety of systems concerning the group work.

2. Description of the Related Art

Typical functions of a groupware system which aids a smooth group work are such as a mail, a library and a forum. Among the foregoing functions, information of, for example, the library and the forum are centrally arranged by a manager of the system. Thus, this management style is effective in routine work or the like which require a specific management.

However, each user has a peculiar method in information arrangement which usually disagrees with the managed arrangement method. If, for example, each person individually gives or changes names of the documents which a group manages by a file server, the document file is substantially lost though the contents of the original file exist. In a case where a plurality of members in the group individually store files in a folder which the group commonly manages, an icon which is unimportant for a certain member may be placed adjacent to an icon of an important file for the member on a folder view, or, icons of files important and unimportant for a member are displayed disorderly.

However, if each user intends to arrange information in an individual manner, a method of arranging information is determined in each system, such as a position and size of icons of a file, folder, mail and the like, a pattern of a figure to be pasted on a view for displaying icons of grouped files by a folder, a mail or the like, an arrangement order of data when being displayed as a list, and a position of insertion of a blank line into data lines. Further, a sharer of a shared document stored in a server or the like cannot be identified. Thus, a user is unable to manage information from his viewpoint.

BRIEF SUMMARY OF THE INVENTION

In view of the foregoing, an object of the present invention is to provide an information processing apparatus and a recording medium in which a computer program managing information is recorded, with which a user can arrange information freely and without any distinction between files managed by a group and personal local documents so that the user is able to individually manage information which is distributedly managed by respective peculiar manners among a variety of systems concerning a group work from his viewpoint.

The information processing apparatus and the recording medium having the computer program managing information according to the present invention provide a user with a computing environment of specifying a position and size of icons of a file, folder, mail and like, of pasting a picture on the icons, of displaying figures, such as circles, squares and the like for grouping the displayed icons, of designating an arrangement order of data when displaying as a list, of instructing the position at which a blank line is inserted into data lines, of displaying a sharer of a shared document and so on.

Other objects, features and advantages of the invention will be evident from the following detailed description of the preferred embodiments described in conjunction with the attached drawings.

BRIEF DESCRIPTION OF THE SEVERAL VIEWS OF THE DRAWING

FIG. 4 is a diagram showing an example of display on a screen of a dialog box of document information of a file object;

FIG. 8 is a diagram showing an example of display on a screen of a list;

FIG. 13 is a diagram showing an example of a mail script on a screen; and

FIG. 14 is a diagram showing a list of sharing information.

DETAILED DESCRIPTION OF THE INVENTION

Figure 1:
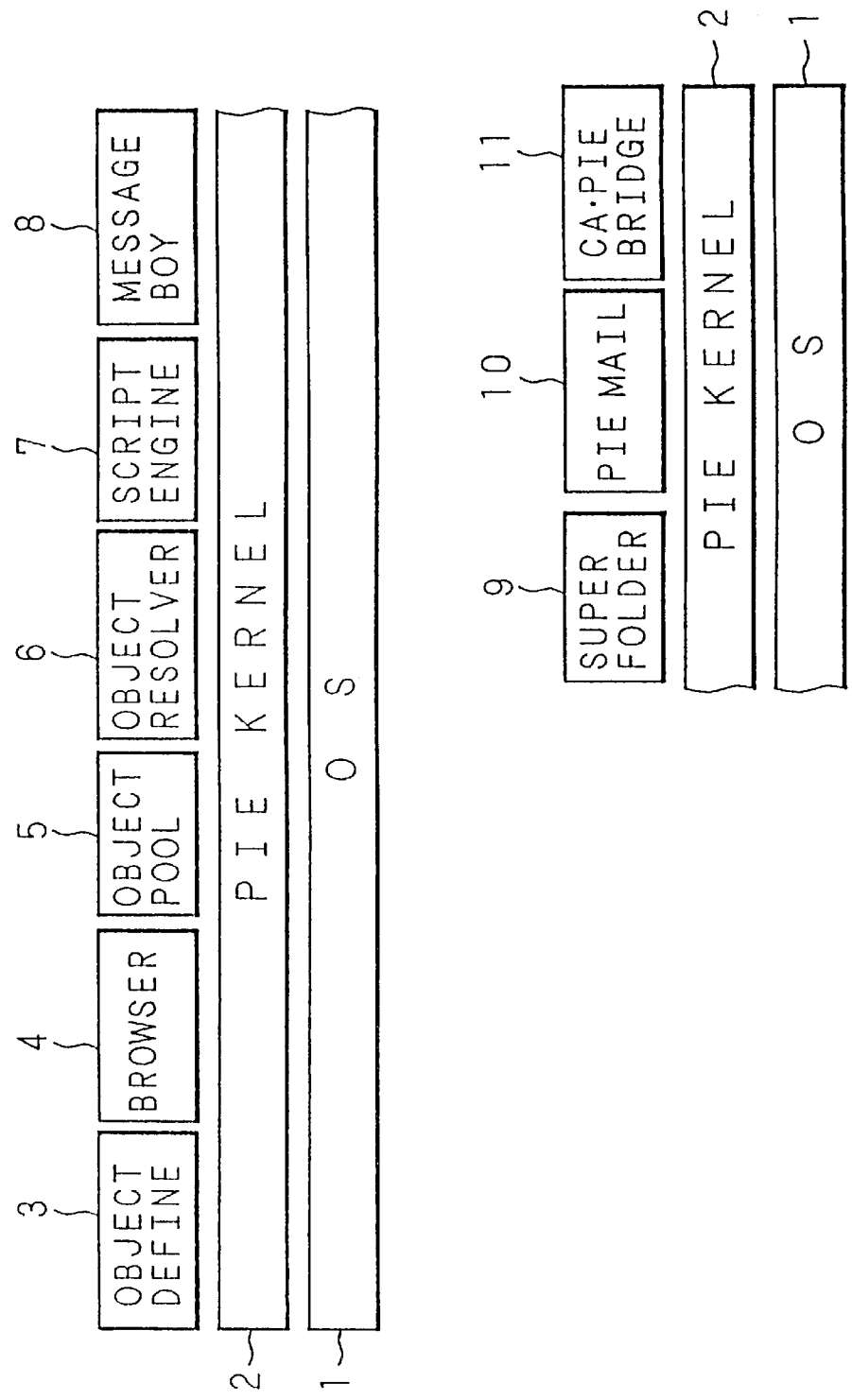
FIG. 1 is a diagram showing the structure of modules of a PIE (Personal Information Environment) system.

FIG. 1 is a diagram showing a module structure of a PIE (Personal Information Environment) system according to the present invention.

Units of information to be processed in the system according to the present invention are object-oriented, that is, events, such as tasks of making reports, drafts for obtaining the sanction and the like, functions like preliminary assembly and meetings, are made to be the units of information to be treated in the form of objects. The respective objects are connected by a variety of links.

The PIE system comprises modules 3 to 11 to be described later and a PIE kernel 2. The PIE kernel 2 forms a message communication layer and is one of the command transmission functions for mediating message communication among modules. Also the PIE kernel 2 has a function for performing message communication between module across a network. As a result, multiple sessions for holding communication with a plurality of PIE systems can be performed.

The modules 3 to 11 can be dynamically added to or separated from the PIE kernel 2. Each of the modules 3 to 11 has a common interface (initialization of a module, acquirement of information of a module, execution of a command with respect to a module, asynchronous notification to module and notification of end of module) with respect to the PIE kernel 2. The modules 3 to 11 are distinguished from one another in accordance with respective IDs (peculiar names).

An object define 3 and a browser 4 define objects on the PIE system such that "Open file when being double-clicked". All of the PIE objects are derived from a PIE basic object where necessary characteristics are defined for each of the objects.

An object pool 5, which is an object storage means, serves as a data base for managing all of the object instances on the PIE system and their link relationships. The object pool 5 has an interface of commands, such as "generation of a PIE object", "deletion of a PIE object" and "retrieval of an object" to generate, delete and retrieve objects.

An object resolver 6 analyzes the script of a command to internally process the protocol of fetching a file from a server so as to fetch the file from the server.

A script engine 7, which is an instruction means, executes a script to cause a super folder 9 to perform a variety of displays, such that an icon of the folder or the like is not always displayed at the position supplied by the system, but at positions instructed by a user so that a plurality of display objects can be displayed being classified with instructed sizes and picture may be pasted on an icon.

The script engine 7 reads a display object of the instructed layer of the hierarchy from the object pool 5 when display data of screens being classified into a hierarchical structure according to the parameter which is the time of making of the display data of the screen so as to cause the super folder 9 to display the display object.

The script engine 7 causes the super folder 9 to display a list of data, such as object names, to insert a blank line between lines of the list instructed by a user and to display the list of data items in the instructed order.

The script engine 7 causes a display command for displaying a share notification, including the ID of the partner of sharing and the pointer to the address at which the shared object is stored, and a mark indication the object being shared together with a display object of the object to be transferred to the partner of sharing. When the display command is transferred from the partner of sharing, the script engine 7 causes the super folder 9 to display a mark indicating an object being shared together with the display object of the shared object.

If the shared object is changed by a user, the script engine 7 causes a display command for displaying the ID of the partner of sharing, notification of change including the pointer to the address at which the changed object is stored and a mark indicating the shared object being changed together with the display object of the shared object to be transferred to the partner of sharing. When this display command is transferred from the partner of sharing, the script engine 7 causes the super folder 9 to display a mark indicating the shared object being changed together with the display object of the shared object.

A message boy 8, which is transfer a means, offers scripts of share notification and change notification to a notification mail server which only the message boy 8 knows, polls the notification mail server and, if a message exists, requests the object resolver 6 to analyze the message.

The super folder 9, which is a display means, pastes a picture to an a instructed position with instructed size, when displaying a shared object in the form of a figure symbolizing each object on the screen, and displays a graphic object composed of a figure and/or a text on the screen on which the display object is displayed.

The super folder 9 displays a correlation diagram showing the link relationships among objects, a mark indicating a shared object, and a mark indicating a changed shared object.

The super folder 9 reads a display object of the instructed layer of the hierarchy from the object pool 5 when display data of screens being classified into a hierarchical structure according to the parameter which is the time of making of the display data of the screen so as to display the display object.

The super folder 9 displays a list of data, such as object names, inserts a blank line between lines of the list instructed by a user and displays the list of data items in the order instructed by the user.

A PIE mail 10 creates a view (see FIG. 12) to use an electronic mail as means for sharing the object.

A CA.PIE bridge 11 mediates each of the modules and an application, such as a CA (Communication Assist) application like a "telephone directory", which is applied outside the system.

In the PIE system, when the display positions of a plurality of display objects, such as the folders, documents and mails, in the form of figures are instructed so as to be divided into groups, the super folder 9 displays the display objects at the instructed positions.

In the PIE system, when another apparatus sharing the object is instructed, the script engine 7 causes the super folder 9 to display a mark indicating the object being shared. Moreover, the script engine 7 causes the message boy 8 to transfer, to another information processing apparatus, the share notification including data for specifying the apparatus and the pointer to the address at which the object is stored and a command to display a mark indicating that the object being shared together with the display object of the object.

In the PIE system, when the object shared with another apparatus is changed, the script engine 7 causes the super folder 9 to display a mark indicating the object being changed together with the display object of the shared object. The script engine 7 causes the message boy 8 to transfer, to another apparatus, change notification including the pointer to the address at which the changed object is stored and a command to display a mark indicating the shared object being changed with the display object of the shared object.

In the PIE system, the object pool 5 stores the display object displayed on the screen, as data in a hierarchical form employing the time of making display data on the screen as the parameter. When the layer of the hierarchy to be displayed has been instructed, the script engine 7 causes the super folder 9 to display a display object of the instructed layer of the hierarchy.

In the PIE system, the script engine 7 causes the super folder 9 to display, on a screen, a list of file names which specify objects. When the position on the screen has been instructed, a blank line is inserted into the instructed position between the lines of the list.

As a result, an object grouping environment favorable for a user can be provided such that shifting of the display objects, such as the folder icons, file icons and the like, pasting of a picture to the display object, display of figure objects, such as figures and texts on the screen which is displaying the display object, insertion of a blank line into the displayed list, arrangement of order of data on the list, organization of the view into a hierarchy, and display of the sharer of the object. Thus, objects can be managed from the viewpoint of the user.

Figure 2:
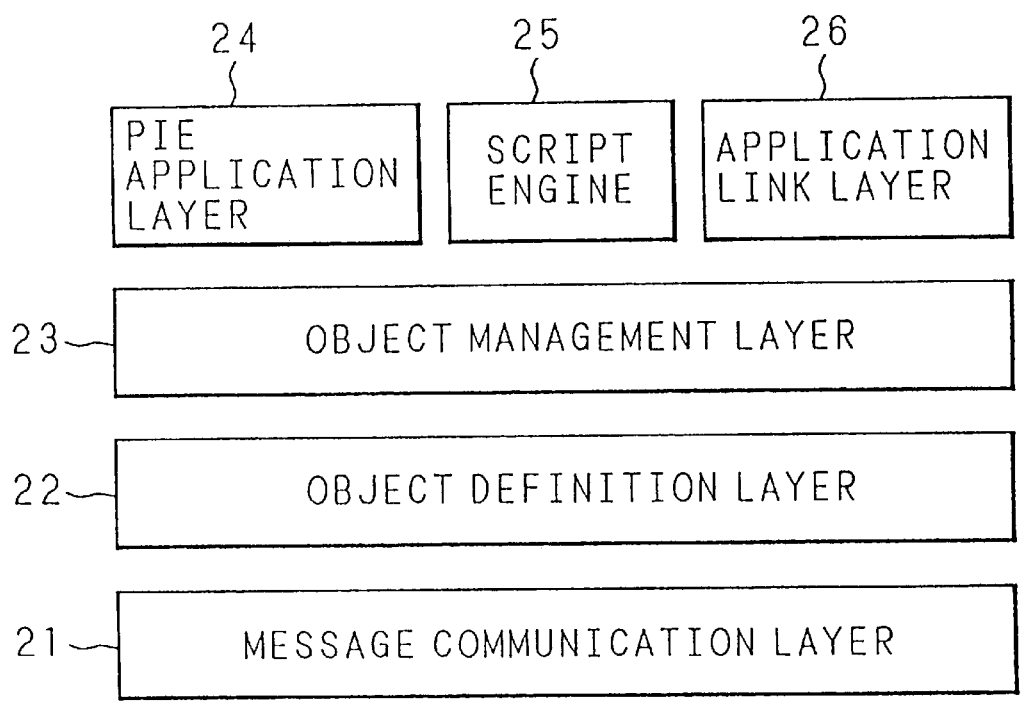
FIG. 2 is a diagram showing the layer structure of each module of the PIE system.

FIG. 2 is a diagram showing a layer structure of each module in the PIE system shown in FIG 1. Each module has the following layer structure depending upon the function. Note that each module is in a DLL (Dynamic Link Library) format. In this embodiment, Windows 3.1, Windows 95 or Windows NT (trademark of Microsoft Corporation, U.S.) is employed as an OS (Operating System) 1.

A message communication layer 21 provides a function of message communication among modules so that modules on the network are permitted to hold message communication among modules.

An object definition layer 22 defines a variety of objects. All of objects are derived from a basic object where necessary characteristics are defined for respective objects. The basic object has a field for data, such as names required for this system, and link and has a method for connecting or disconnecting the link and a method for displaying the link.

An object management layer 23 manages the instance of the defined object. All of the objects are managed by this layer so that an aggregate of objects is formed in the object management layer 23.

Applications for the PIE system are formed on the object management layer 23, the applications being classified into three blocks including a PIE application layer 24 using objects, a script engine layer 25 for controlling the object module from outside and an application link layer for realizing a linking function with general applications independent form the PIE system.

The application is created to operate the following PIE basic object. That is an object which the application is not conscious of can be treated similarly to an object which the application can be conscious of. For example, although an application for a folder is produced to mainly treat a document, the folder is able to treat an object, such as a mail and a task, similarly to the document. Moreover, the application is accessible to the aggregate of objects in the object management layer 23.

The PIE basic object has fields for names and links and a method of connecting or disconnecting the link.

Data of the PIE basic object includes, for example, "name of object", "ID of object", "type of object", "pointer to entity", "pointer to linked (referred) ID object", "pointer to linked (referred) memory object", "meaning of connected (referred) link", "pointer to ID object linking (referring) to", "pointer to memory object linking (referring) to", "meaning of linkage linking (referring) to" "bitmap data for display", "pallet data for display", "shared object flag", "unread/read flag", "date of making", "date and time of modification" and the like.

The member function of the PIE basic object includes "basic object serialize function", "character string array serialize function", "definition of"="of PIE object" and the like.

The member function of the PIE basic object which is rewritten in accordance with the object type to be treated on the PIE system includes, for example, "object open", "object close", "default display", "object display", "display of text attached to the object", "object detailed information", "link setting", "link suspension", "status change notification", "link type change", "acquisition of order of links", "acquisition of text of object", "notification of superimposition of objects" and the like.

From the PIE basic object, "document object" and "mail envelope object", which are information unit objects, and "folder object" and "figure object" which are display system objects are derived.

The operation of the PIE system will now be described on referring to examples of display on the screen is explained.
1. Folder View FIG. 3 shows a folder view in PIE system.

Objects, such as a folder, document, figure, mail and the like defined by the PIE system can be disposed at an arbitrary positions on the PIE folder. The PIE system manages the objects and provides the view.
2. File Object A file object has document information shown in FIG. 4. The file object is managed with the file name and a path (including method of file management system, server name, directory name and file name (depending on system)). The name is used by a user to identify the file object on the folder and managed by each user. The path indicates a pointer with which the system identifies the entity of the file and which is composed of the method of the file management system, the server name, the directory name and the file name.

Figure 3:
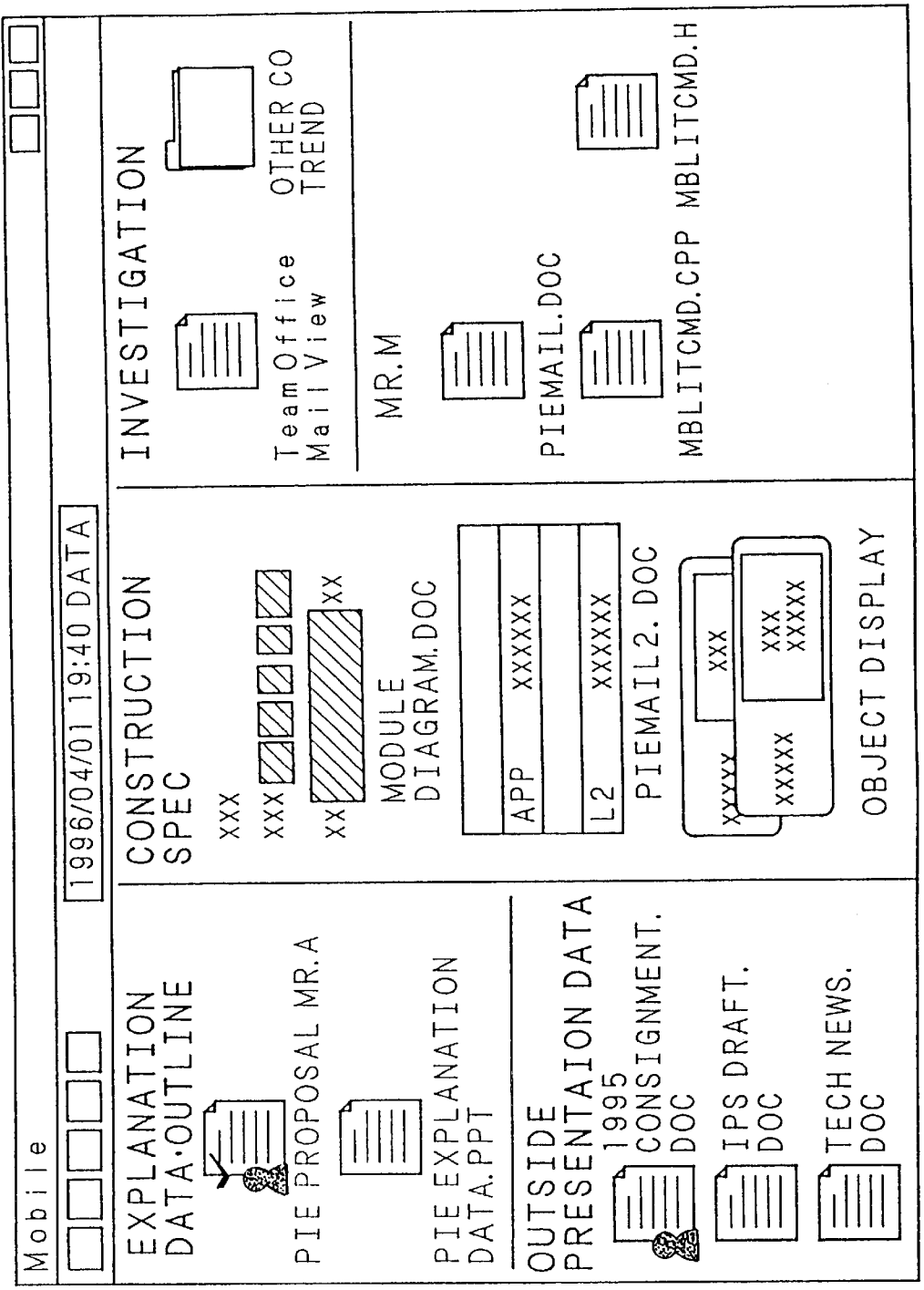
FIG. 3 is a diagram showing an example of display on a screen of a folder view.

Referring to FIG. 3, a file object "PIE proposal (Mr. A)" has, on the network file server, a pointer "96021300.DOC" for the entity of the file with which a plurality of users are accessible. However the user can give an arbitrary name for a file on the folder independently from the entity. "Name of document (doc name)" shown in FIG. 4 indicates name individually set by a user on the PIE folder, while "path name (path)" indicates a path of the file to the entity.

Although a latter half of the path name is omitted in FIG. 4, the actual path name is "NT:¥¥matisse¥eo2—2¥PIE¥SHARE¥96021300.DOC" which indicates a fact that an actual file is placed in a directory called "Share" under a directory called "PIE" on a file server having name "Matisse". "NT" in the leading portion of the path indicates a fact that the file "96021300.DOC" exists on Windows NT server. If the server is NetWare (trademark of Novell Corporation, U.S.), "NW" is employed. If the server is TeamOffice (Trademark of Fujitsu Ltd.), "TO" is employed. The object resolver 6 of the PIE system interprets the leading line to internally process the protocol of fetching the file from the server.

Figure 5:
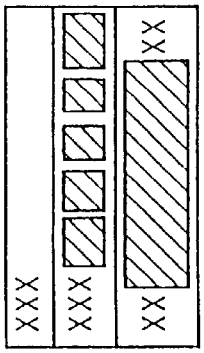
FIG. 5 is a diagram showing another example of display on a screen of a dialog box of document information of a file object.

Similarly to name, each user is able to assign individual name, memo data and bitmap data to personal file object in the fields "memo" and "bitmap" shown in FIG. 4. In the example shown in FIG. 4, "memo" contains "proposal for operation division". In the case of a file object "Module diagram.DOC" shown in FIG. 3, the file object has bitmap data as shown in FIG 5.

As for a file object having no specified bitmap data, bitmap data of an icon provided by the system is pasted as a default to be displayed on the PIE folder. If the file object has bitmap data as shown in FIG. 5, the pasted bitmap data is displayed on the PIE folder, as shown in FIG. 3.

The bitmap size of the folder object on the PIE folder is changeable. When a folder object is selected, a button for changing the size is displayed at, for example, the lower right portion of the folder object.

The file object can be used as a file template by marking the section "format" of document information. A file object of a type in which the section "format" of document information is not marked is operated such that a file indicated by the pointer is simply opened when a user double-clicks the file object on the PIE folder. However, in a case where the section "format" is marked, a new file object and a copy of the entity of the file are created, and then the copied file is opened. The pointer of the thus produced file object indicates the copied file.

3. Sharing

The entity of a file can be shared with a plurality of users. A file object having a path to the entity of the shared file has a sharing mark in the form like a person as displayed in the lower left portion of the file "PIE proposal (Mr. A)" shown in FIG. 3.

Though a file being shared, name, memo and bitmap data are under management of each user. Therefore, name, memo and bitmap data can be freely set by each user.

The name of the sharer of the file is indicated in document information shown in FIG. 4. Referring to FIG. 4, names of the two persons (A and B) are displayed.

If a person among the sharers changes the contents of the file, a check mark of change notification as shown in the upper left portion of the file "PIE proposal (Mr. A)" shown in FIG. 3 is displayed on the file object having the pointer for the changed file until the contents of the file are confirmed by opening the file.

If the section "notification at the time of change (inform of change)" shown in FIG. 4 is marked, change by the sharer is directly displayed as a dialog box. As a result, the subject file object is stored in the PIE folder and therefore change of the file can be notified even if it is not displayed on the view of the user.

Since the change notification message is informed asynchronously by using the mail as the medium, the PIE system is not required to be operated when the sharer changes the contents. When the system is activated, the system acquires the mail having the contents whether the change notification exists.

Figure 11:
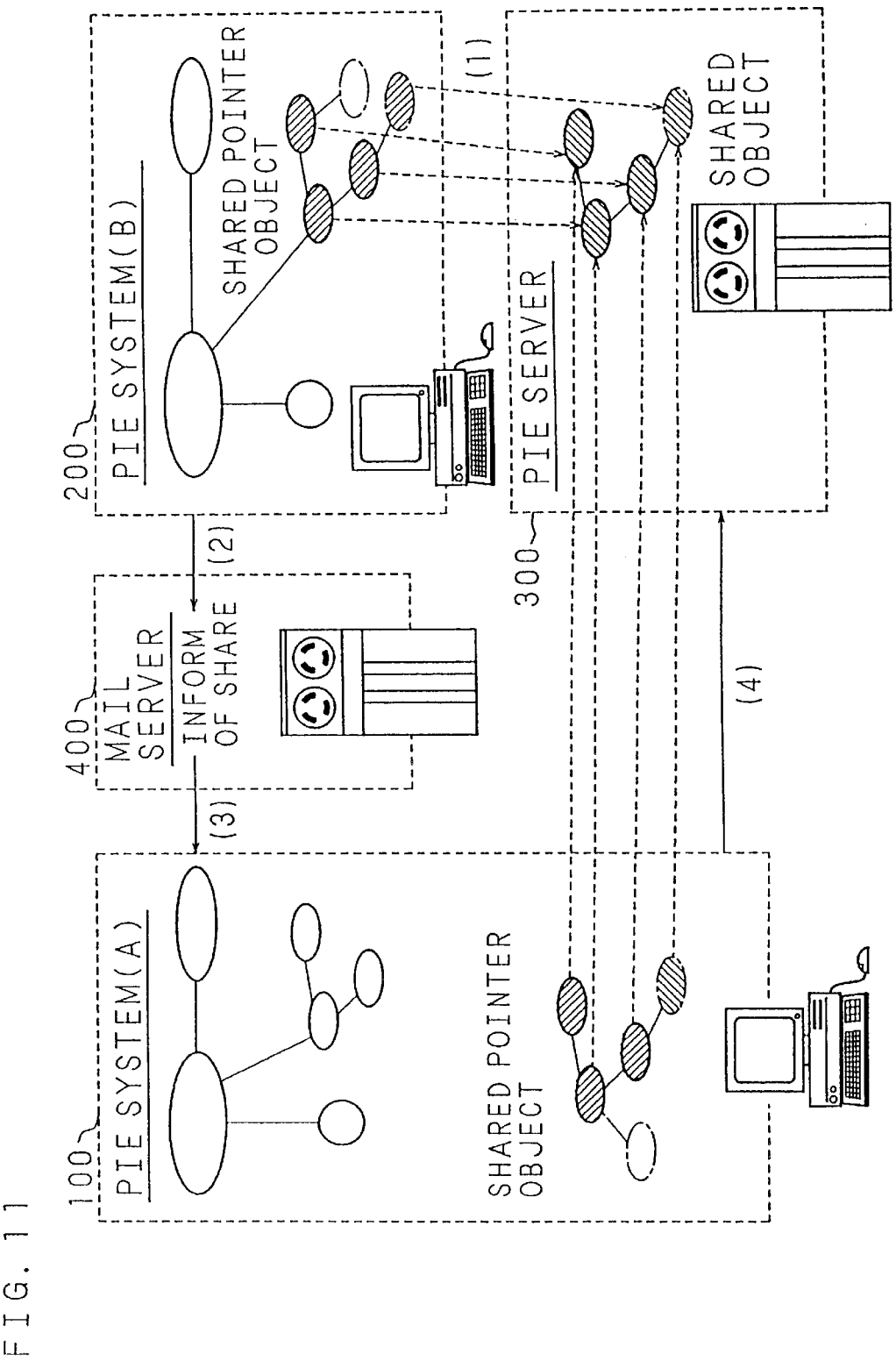
FIG. 11 is a schematic view showing the mechanism of object sharing.

FIG. 11 is a schematic view of the mechanism of object sharing.

The entity of an object to be shared is copied to a PIE server 300 so that a shared object is created in the PIE server 300 (1); the attribute of the object of the PIE system (B) 200 to be shared is copied, and the pointer of the original object is made to be a shared object (a shared pointer object). By using a mail server 400, a sharing control code is transferred to a PIE system (A) 100 (2). The PIE system (A) 100 receives, from the mail server 400, the sharing mail control code (3). The PIE system (A) 100 produces a sharing pointer object and the shared object in the PIE server 300 is pointed (4).

Usually, object locally exist as personal objects. If sharing an object with another sharer, the object is made to be a shared object and a shared pointer object.

The shared object is always shared and operation, generation of an object and deletion of the same are as well as shared.

Sharing is performed by using a script including a pointer of the object. For example, a basic script for sharing a document is as follows:

PIE-Script: {a=CreateObject(pieobjdoc);SetObjectEntity(a, "nt:¥vision¥home¥aa.doc");}

Initially, the object is created by the partner of sharing, and then the object and the entity of the file are combined as a pointer.

In the PIE system, file sharing is performed by using a mail as the medium, as shown in FIG. 11.

Figure 12:
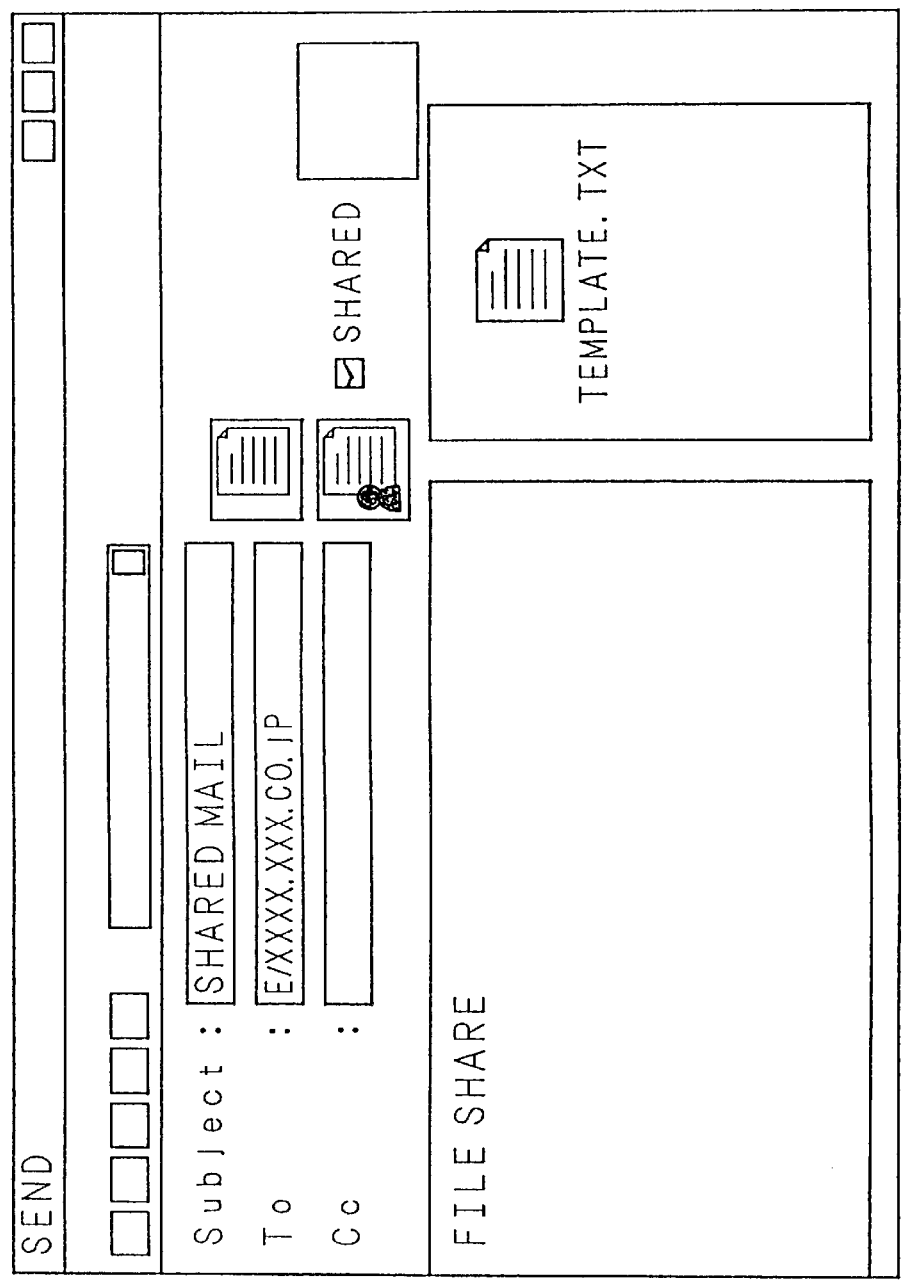
FIG. 12 is a diagram showing a mail processing view.

Initially, the mail sending screen is opened to select a file intended to be shared as an attachment (attached document). Referring to FIG. 12, a file "TEMPLATE/TXT" is selected as the attachment.

The sharer is selected by "address (to:)". A plurality of sharers can be selected. File sharing is performed by a script and therefore the entity of the file is not transferred. Accordingly, any mail system may be employed as the medium for sharing if it is able to transfer a text. In this embodiment, file sharing is enabled with either of TeamOffice Mail (trademark of Fujitsu Ltd.) or e-Mail or Nifty Mail (trademark of NIF).

When the check box "sharing" shown in FIG. 12 is marked, a mail shown in FIG. 13 is transferred to the mail receiver.

When a mail is transferred, a file "96050900.000" for managing sharing information and "96050900.TXT" which is a copy of "TEMPLATE.TXT" are created in a network file server to which all of the file sharers are able to access.

On the side of the partner of sharing which has received the script shown in FIG. 13, a file object is initially formed. Then, "96050900.000" for managing sharing information and the file "96050900.TXT" which is being actually shared are set to the foregoing object. Then, a name "TEMPLATE.TXT" is given to the object, and then linked with the message ID of the mail.

In reality, the script is not displayed for the partner of sharing, and the script is internally and automatically processed.

A file having an extension ".000" for managing sharing information manages information shown in FIG 14.

Notification of sharing is performed as follows by similarly using a script.

(1) When sharing information unit object is completed "Close ( )" method is called.

(2) The object acquires a list of sharers in "Close ( )" and requests the message boy 8 to offer the sharer the following script as asynchronous notification.

(3) PIE-SCRIPT:

{ a=FindEntityObject ("NT : ¥¥matisse¥share¥000. txt")

StatusChanged (a, "PIESTATUSUNREAD", "XXXX", 960126;

}

(4) The asynchronous notification means transference of a mail to a notification mail server which only the message boy 8 knows.

(5) The message boy 8 transfers the change notification mail for each user to the notification mail server which only the message boy 8 knows.

(6) The message boy 8 of each system polls the notification mail server, and requests the object resolver 6 to analyze the message if the message exists.

(7) The object resolver 6 analyzes the script, retrieves the objects and calls change notification "ChangeStatus" method for the object.

(8) The object performs a change process adaptable to the class thereof.

4. Figure Object

Figure 6:
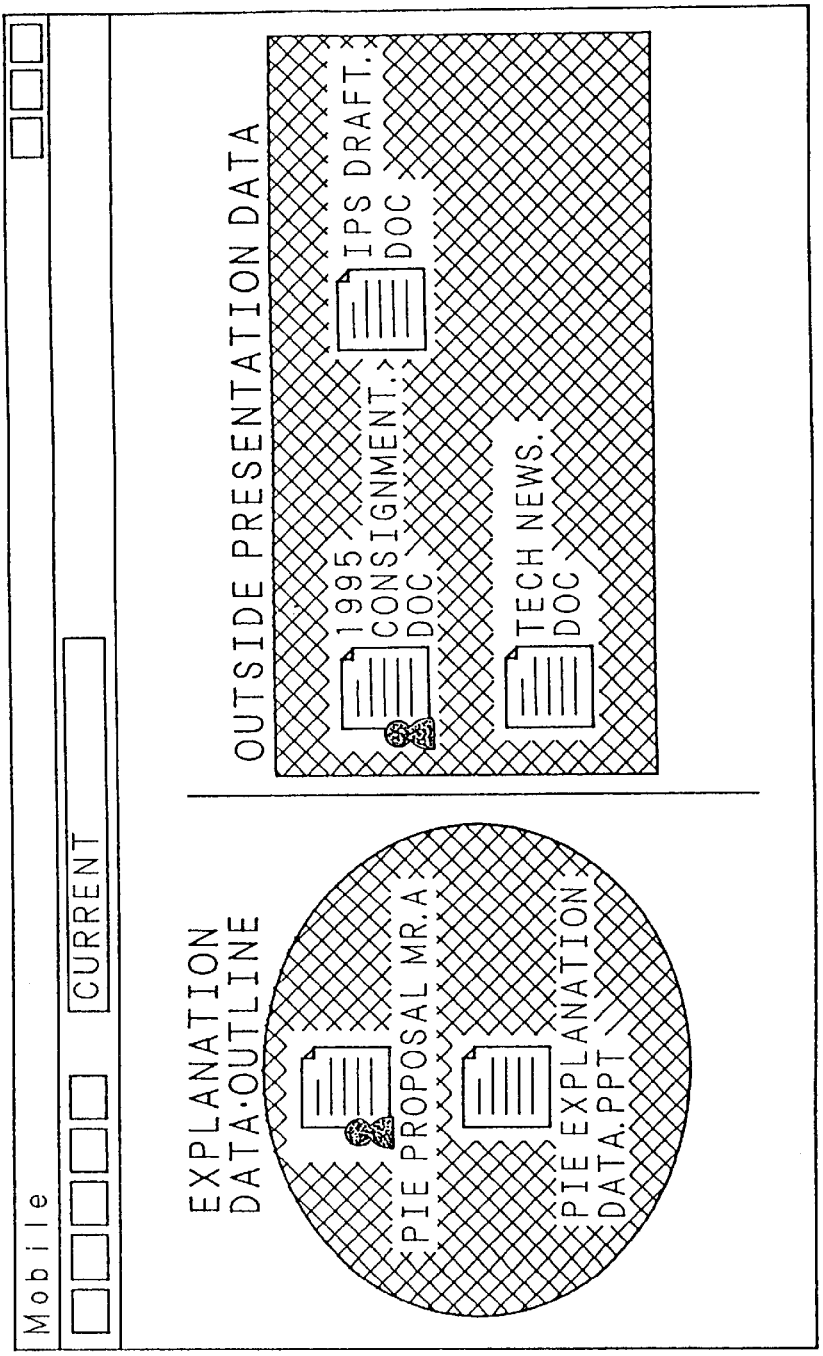
FIG. 6 is a diagram showing an example of display on a screen of a folder view.

Figure objects can be placed on the PIE folder, as shown in FIG. 6. The figure object includes "line", "square", "circle" and "text" which can be disposed on the PIE folder similarly to the file object.

The type and color of the "line" of the figure object can be specified.

The type and color of a line of the contour, whether to fill the region, and color of the region filling can be specified for the "square" and the "circle" of the figure object.

The type and color of a line for forming the contour, whether to fill the region, color of region filling, font and text to display can be specified for the "text" of the figure object.

5. Time Shift

Figure 7:
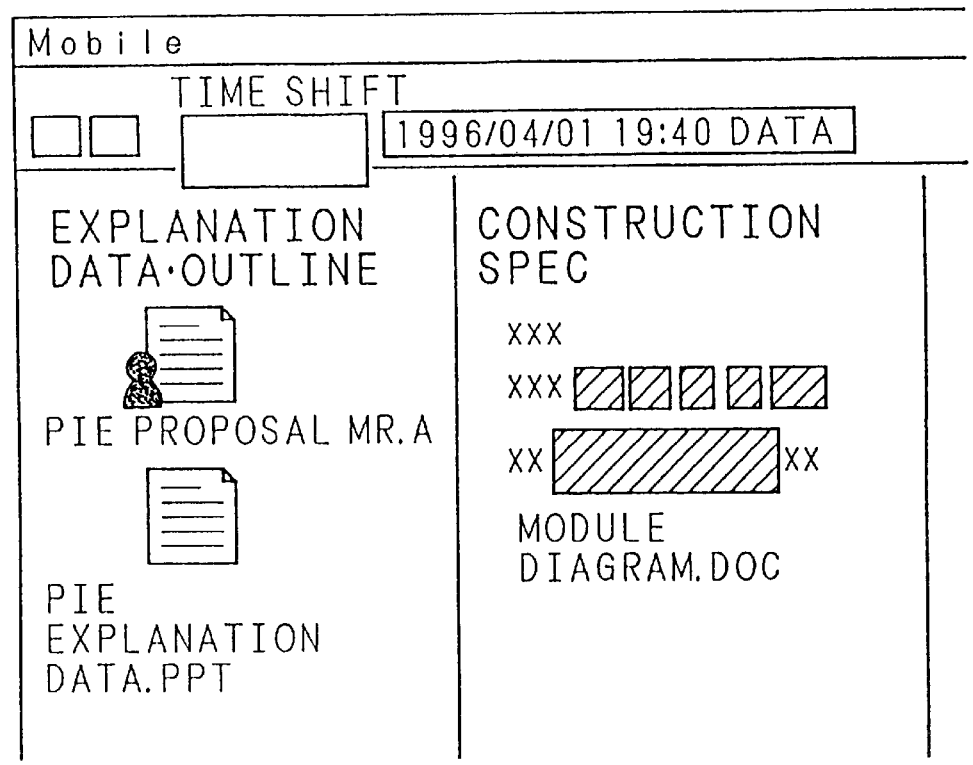
FIG. 7 is a diagram showing an example of display on a screen of time shift.

In the PIE folder, the views can be classified into a hierarchical structure employing the time as the parameter. In the upper portion of FIG. 7, a menu column "time shift" and a time layer display column (in FIG. 7, "1996/04/01, . . ,) are provided.

By selecting time shift "freeze" in the menu, the layer of the folder increases. When "freeze" is selected, a dialog box is displayed to require "time of freezing" and "comment". The time and comment, which are input here, are displayed in the column for displaying the time layer. The latest layer is displayed as "present".

The shift of the layer can be performed from both of the menu column and the display column. When shifting the layer from the display column, a user must select the display column, and then depress upward cursor key and a downward cursor key so as to shift the layer.

When a new layer is created, all objects of the previous layer is displayed with position information. Even if the object is deleted or moved on the new layer, the lower layer is not affected. Similarly, deletion and movement in the lower layer do not affect the upper layer, that is, they can be treated like independent folders.

Figure 10A:
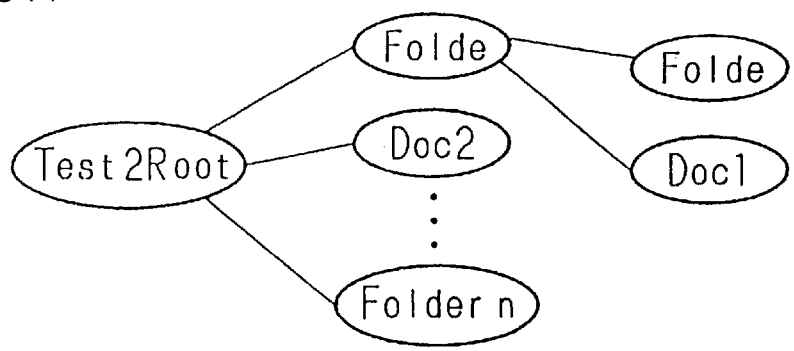
FIGS. 10A to 10C are schematic views showing the mechanism of time shift.

When the system is activated, the super folder 9 retrieves and holds a root object of a folder named "Test2Root" shown in FIG. 10A. Although the "Test2Root" itself is a folder object, the folder application creates a frame window and pastes the folder object folder object in the frame window.

Figure 10B:
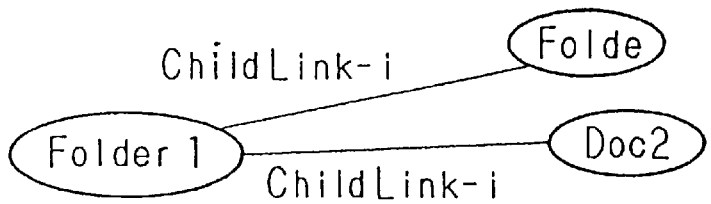
Figure 10C:
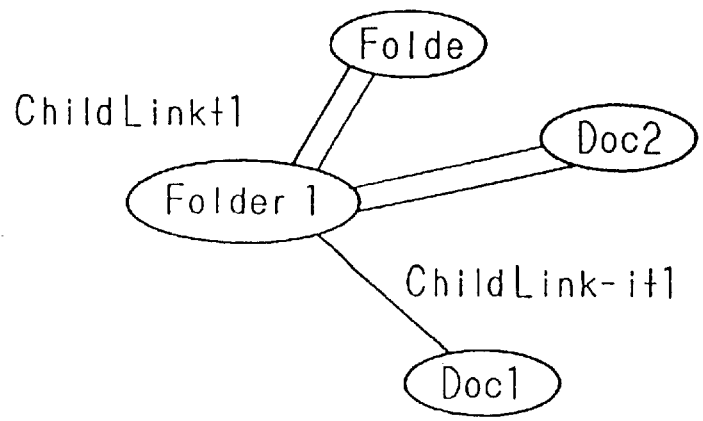

Time shift is performed by using the structure of the hierarchical folder as shown in FIG. 10 so as to select an object to be displayed at present referring to the current layer values as shown in FIGS. 10B and 10C.

6. List Display

In the PIE folder the view can be displayed into a list as shown in FIG. 8. A user can change the order of arrangement by depressing the cursor movement button of up and down. The arrangement order does not depend upon time or name. Moreover, the user can insert a blank line into the list. Insertion and deletion of the blank line are performed by a blank line insertion/deletion button. As a result, list display of the PIE folder enables files to be arranged in groups which are meaningful for the user.

Also in the display by the list, information of sharing, change notification and the like are displayed on the icon, similarly to the display of the folder. In a case of a mail object as shown in FIG. 8, with or without an attachment is as well as displayed.

Similarly to a usual display by the folder, time shift can be performed with the display by the list.

7. Link Display

Figure 9:
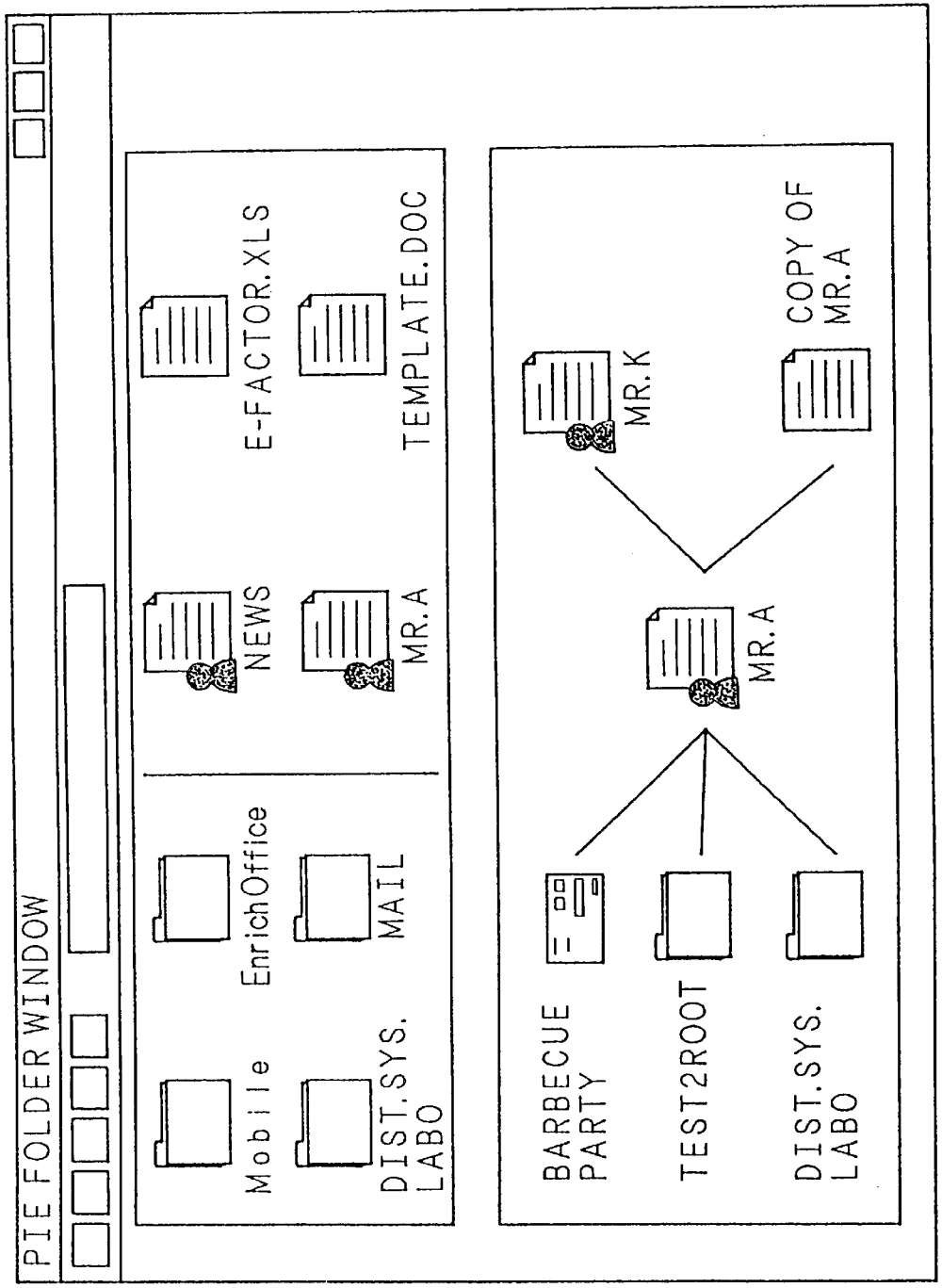
FIG. 9 is a diagram showing an example of display on a screen of a lick view.

The PIE folder has a link view as shown in FIG. 9. The link view is such that objects being linked from the selected object are displayed centering the selected object on the view. FIG. 9 shows an example of the link view in which one upper layer and one lower layer are displayed. Display of the link view is immediately changed when the selected object in the folder view is changed. Similarly to the folder view, it is able to open an object selected by double-clicking from the link view as well as to display the related objects.

The color and type of the linkage line are different depending on the type of the linkage. For example, a gray line for folder/file, red for mail/attachment, and blue for file/file.

8. Browsing View

Objects on the PIE folder have a relationship with a browsing view for displaying the contents of the objects. When the browsing view is opened and an object is selected on the folder view, text information and bitmap information of the object are immediately displayed on the browsing view.

When, for example, "news" shown in FIG. 9 is selected, the contents of "news" are displayed on the browsing view.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A personal information environment system, comprising:

a plurality of modules storing data selectable by a user through an operation of pointers representing the data, the data having various attributes selectively added and erased by the user;

a display displaying the pointers such that the user is allowed to select data from the modules as desired;

a display position designating unit selectable by the user so as to designate a position where the desired data is displayed in groups; and an instruction unit operating the display so as to display the selected data at the position designated by the display position designating unit, wherein the modules share a kernel connected to an operating system.

2. The personal information environment system as set forth in claim 1, further comprising a size designation unit designating display size of said selected data, wherein said instruction unit causes said display to display selected data with respective sizes designated by said size designation unit.

3. The personal information environment system as set forth in claim 1, wherein said instruction unit causes said display to paste a picture on the selected data.

4. The personal information environment system as set forth in claim 2, wherein said instruction unit causes said display to paste a picture on the selected data.

5. The personal information environment system as set forth in claim 1, wherein said instruction unit causes said display to display a figure object including a figure and/or text, on the screen where selected data is displayed.

6. The personal information environment system as set forth in claim 2, wherein said instruction unit causes said display to display a figure object including a figure and/or text, on the screen where selected data is displayed.

7. The personal information environment system as set forth in claim 3, wherein said instruction unit causes said display to display a figure object including a figure and/or text, on the screen where selected data is displayed.

8. The personal information environment system as set forth in claim 4, wherein said instruction unit causes said display to display a figure object including a figure and/or text, on the screen where selected data is displayed.

9. The personal information environment system as set forth in claim 1, further comprising an object storage unit storing a link relationship between data to be managed, wherein said instruction unit causes said display to display a correlation diagram describing a link relationship between data to be managed by using selected data of said data to be managed.

10. The personal information environment system as set forth in claim 1, further comprising a transference unit transferring data to another apparatus, and a sharer designation unit designating another apparatus to share data with, wherein said instruction unit causes said transference unit to transfer, to said other apparatus, a sharing notification which includes data to specify the apparatus designated by the sharer designation unit and the pointer to the address where said data is stored, with a command to display a mark indicating said data being shared together with the display data of said data, and said display displays the mark indicating said data being shared together with the display data of the data shared with the other apparatus.

11. The personal information environment system as set forth in claim 9, further comprising a transference unit transferring data to another apparatus, and a sharer designation unit designating another apparatus to share data with, wherein said instruction unit causes said transference unit to transfer, to said other apparatus, a sharing notification which includes data to specify the apparatus designated by the sharer designation unit and the pointer to the address where said data is stored, with a command to display a mark indicating said data being shared together with the display data of said data, and said display displays the mark indicating said data being shared together with the display data of the data shared with the other apparatus.

12. The personal information environment system as set forth in claim 6, wherein said instruction unit causes said display to display the mark indicating the data being shared together with the display data of said data if said display command is transferred from another apparatus.

13. The personal information environment system as set forth in claim 9, wherein said instruction unit causes said display to display the mark indicating the data being shared together with the display data of said data if said display command is transferred from another apparatus.

14. The personal information environment system as set forth in claim 6, wherein said instruction unit transfers, to another apparatus, a change notification which includes data to specify said other apparatus and the pointer to the address where the changed data is stored, with a command to display a mark indicating said data being changed together with the display data of said data, and causes said display to display the mark indicating a shared data being changed together with the display data of said shared data if the shared data with the other apparatus is being changed.

15. The personal information environment system as set forth in claim 11, wherein said instruction unit transfers, to another apparatus, a change notification which includes data to specify said other apparatus and the pointer to the address where the changed data is stored, with a command to display a mark indicating said data being changed together with the display data of said data, and causes said display to display the mark indicating a shared data being changed together with the display data of said shared data if the shared data with the other apparatus is being changed.

16. The personal information environment system as set forth in claim 12, wherein said instruction unit transfers, to another apparatus, a change notification which includes data to specify said other apparatus and the pointer to the address where the changed data is stored, with a command to display a mark indicating said data being changed together with the display data of said data, and causes said display to display the mark indicating a shared data being changed together with the display data of said shared data if the shared data with the other apparatus is being changed.

17. The personal information environment system as set forth in claim 13, wherein said instruction unit transfers, to another apparatus, a change notification which includes data to specify said other apparatus and the pointer to the address where the changed data is stored, with a command to display a mark indicating said data being changed together with the display data of said data, and causes said display to display the mark indicating a shared data being changed together with the display data of said shared data if the shared data with the other apparatus is being changed.

18. The personal information environment system as set forth in claim 14, wherein said instruction unit causes said display to display the mark indicating said shared data being changed together with the display data of said shared data if said display command is transferred from another apparatus.

19. The personal information environment system as set forth in claim 15, wherein said instruction unit causes said display to display the mark indicating said shared data being changed together with the display data of said shared data if said display command is transferred from another apparatus.

20. The personal information environment system as set forth in claim 9, further comprising a layer designation unit designating, the layer of display data to be displayed on a screen by said display wherein said data storage unit stores display data displayed on a screen as hierarchical data by classifying the display data employing the making time of the display data on the screen as a classification parameter, and said instruction unit causes said display to read out the display data from said data storage unit, and to display the read out display data.

21. The personal information environment system as set forth in claim 10, further comprising a layer designation unit designating the layer of display data to be displayed on a screen by said display, wherein said data storage unit stores display data displayed on a screen as hierarchical data by classifying the display data employing the making time of the display data on the screen as a classification parameter, and said instruction unit causes said display to read out the display data from said data storage unit, of the layer designated by said layer designation unit, and to display the read out display data.

22. The personal information environment system as set forth in claim 11, further comprising a layer designation unit designating the layer of a display data to be displayed on a screen by said display, wherein said data storage unit stores display data displayed on a screen as hierarchical data by classifying the display data employing the making time of the display data on the screen as a classification parameter, and said instruction unit causes said display to read out the display data from said data storage unit, of the layer designated by said layer designation unit, and to display the read out display data.

23. The personal information environment system as set forth in claim 12, further comprising a layer designation unit designating the layer of a display data to be displayed on a screen by said display, wherein said data storage unit stores display data displayed on a screen as hierarchical data by classifying the display data employing the making time of the display data on the screen as a classification parameter, and said instruction unit causes said display to read out the display data from said data storage unit, of the layer designated by said layer designation unit, and to display the read out display data.

24. The personal information environment system as set forth in claim 10, further comprising a layer designation unit designating the layer of display data to be displayed on a screen by said display, wherein said display storage unit stores display data displayed on a screen as hierarchical data by classifying the display data employing the making time of the display data on the screen as a classification parameter, and said instruction unit causes said display to read out the display data from said data storage unit, of the layer designated by said layer designation unit, and to display the read out display data.

25. The personal information environment system as set forth in claim 14, further comprising a layer designation unit designating the layer of display data to be displayed on a screen by said display, wherein said data storage unit stores display data displayed on a screen as hierarchical data by classifying the display data employing the making time of the display data on the screen as a classification parameter, and said instruction unit causes said display to read out the display data from said data storage unit, of the layer designated by said layer designation unit, and to display the read out display data.

26. The personal information environment system as set forth in claim 15, further comprising a layer designation unit designating the layer of a display data to be displayed on a screen by said display, wherein said data storage unit stores display data displayed on a screen as hierarchical data by classifying the display data employing the making time of the display data on the screen as a classification parameter, and said instruction unit causes said display to read out the display data from said data storage unit, of the layer designated by said layer designation unit, and to display the read out display data.

27. The personal information environment system as set forth in claim 18, further comprising a layer designation unit designating the layer of display data to be displayed on a screen by said display, wherein said data storage unit stores display data displayed on a screen as hierarchical data by classifying the display data employing the making time of the display data on the screen as a classification parameter, and said instruction unit causes said display to read out the display data from said data storage unit, of the layer designated by said layer designation unit, and to display the read out display data.

28. An information processing apparatus as set forth in claim 19, further comprising layer designation means for designating the layer of a display object to be displayed on a screen by said display means, wherein said object storage means includes means for storing display objects displayed on a screen as hierarchical data by classifying the display objects employing the making time of the display data on the screen as a classification parameter, and said instruction means includes means for causing said display means to read out the display object from said object storage means, of the layer designated by said layer designation means, and to display the read out display object.

29. A computer memory product to process information, containing a computer readable program to display, on a screen of a personal information environment display, said program comprising:

storing data selectable by a user through an operation of pointers representing the data, the date having various attributes selectively added and erased by the user;

displaying the pointers such that the user is allowed to select data as desired;

designating a position where the desired data is displayed in groups; and operating the screen to display the selected data at the designated position.

30. A computer memory product as set forth in claim 21, wherein said program further comprises:

designating another apparatus to share data with;

displaying a mark which indicates said data is being shared together with the display data of said data; and transferring, to said other apparatus, a sharing notification which includes data to specify said other apparatus and the pointer to the address at which said data is stored, with a command to display a mark indicating said data being shared together with the display data of said data.

31. A computer memory product as set forth in claim 21, wherein said program further comprises:

displaying a mark indicating the shared data being changed together with the display data of said data, if the shared data is changed; and transferring, to said other apparatus, a change notification which includes data to specify said other apparatus and the pointer to the address at which the changed data is stored, with a command to display a mark indicating said shared data is being changed together with the display data of said shared data.

32. A computer memory product as set forth in claim 30, wherein said program further comprises:

displaying a mark indicating the shared data is being changed together with the display data of said shared data, if the shared data is changed; and transferring, to said other apparatus, a sharing notification which includes data to specify said other apparatus and the pointer to the address at which the changed data is stored, with a command to display a mark indicating said shared data is being changed together with the display data of said shared data.

33. A computer memory product as set forth in claim 21, wherein said program further comprises:

storing display data displayed on a screen as hierarchical data by classifying the display data employing the making time of the display data on the screen as a classification parameter;

designating the layer of display data to be displayed on the screen; and displaying the display data on the screen of the designated layer.

34. A computer memory product as set forth in claim 30, wherein said program further comprises:

storing display data displayed on a screen as hierarchical data by classifying the display data employing the making time of the display data on the screen as a classification parameter;

designating the layer of display data to be displayed on the screen; and displaying the display data on the screen of the designated layer.

35. A computer memory product as set forth in claim 31, wherein said program further comprises:

storing display data displayed on a screen as hierarchical data by classifying the display data employing the making time of the display data on the screen as a classification parameter;

designating the layer of display data to be displayed on the screen; and displaying the display data on the screen of the designated layer.

36. A computer memory product as set forth in claim 32, wherein said program further comprises:

storing display data displayed on a screen as hierarchical data by classifying the display data employing the making time of the display data on the screen as a classification parameter;

designating the layer of display data to be displayed on the screen; and displaying the display data on the screen of the designated layer.

37. A computer memory product for use with a personal environment, comprising:

a computer usable storage medium having computer readable program code storing data selectable by a user through an operation of pointers representing the data, the data having various attributes selectively added and erased by the user, said computer readable program code comprising:

computer readable program code displaying the pointers such that the user is allowed to select data as desired;

computer readable program code designating a position where the desired data is displayed in groups; and operating a display to display the selected data at the designated position.

38. A computer memory product as set forth in claim 37, further comprising:

computer readable program code causing said computer to accept designation of another apparatus to share data with;

computer readable program code causing said computer to display a mark indicating data as being shared with said other apparatus together with the display data of the shared data with the other apparatus; and computer readable program code causing said computer to transfer a sharing notification which includes data to specify the designated apparatus and the pointer to the address where said data is stored, with a command to display a mark indicating said data as being shared together with the display data of said data.

39. A computer memory product as set forth in claim 37, further comprising:

computer readable program code causing said computer to display a mark indicating the shared data as being changed together with the display data of said shared data if the data shared with the other apparatus is changed; and computer readable program code causing said computer to transfer a change notification which includes data to specify said other apparatus and the pointer to the address where said changed data is stored, with a command to display a mark indicating said data as being changed together with the display data of said shared data.

40. A computer memory product as set forth in claim 38, further comprising:

computer readable program code causing said computer to display a mark indicating the shared data as being changed together with the display data of said shared data if the data shared with the other apparatus is changed; and computer readable program code causing said computer to transfer a change notification which includes data to specify said other apparatus and the pointer to the address where said changed data is stored, with a command to display a mark indicating said data as being changed together with the display data of said shared data.

41. A computer memory product as set forth in claim 37, further comprising:

computer readable program code causing said computer to store display data displayed on a screen as hierarchical data by classifying the display data employing the making time of the display data on the screen as a classification parameter;

computer readable program code causing said computer to instruct a user to designate the layer of the display data to display; and computer readable program code causing said computer to display the display data of the designated layer.

42. A computer memory product as set forth in claim 38, further comprising:

computer readable program code causing said computer to store display data displayed on a screen as hierarchical data by classifying the display data employing the making time of the display data on the screen as a classification parameter;

computer readable program code causing said computer to instruct a user to designate the layer of the display data to display; and computer readable program code causing said computer to display the display data of the designated layer.

43. A computer memory product as set forth in claim 39, further comprising:

computer readable program code causing said computer to store display data displayed on a screen as hierarchical data by classifying the display data employing the making time of the display data on the screen as a classification parameter;

computer readable program code causing said computer to instruct a user to designate the layer of the display data to display; and computer readable program code causing said computer to display the display data of the designated layer.

44. A computer memory product as set forth in claim 40, further comprising:

computer readable program code causing said computer to store display data displayed on a screen as hierarchical data by classifying the display data employing the making time of the display data on the screen as a classification parameter;

computer readable program code causing said computer to instruct a user to designate the layer of the display data to display; and computer readable program code causing said computer to display the display data of the designated layer.

45. The personal information environment system according to claim 1, wherein the various attributes comprise at least one of a name, bitmap, link and memory.

* * * * *